(12) United States Patent
Lee et al.

(10) Patent No.: US 8,879,008 B2
(45) Date of Patent: Nov. 4, 2014

(54) STEREO-SCOPIC IMAGE PANEL, STEREO-SCOPIC IMAGE DISPLAY APPARATUS HAVING THE SAME AND DRIVING METHOD THEREOF

(75) Inventors: Hyun Lee, Daejeon-si (KR); Eung Don Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 31 days.

(21) Appl. No.: 13/559,863

(22) Filed: Jul. 27, 2012

(65) Prior Publication Data

US 2013/0088653 A1   Apr. 11, 2013

(30) Foreign Application Priority Data

Oct. 5, 2011   (KR) ......................... 10-2011-0101084

(51) Int. Cl.
  *G02F 1/1335* (2006.01)
  *H04N 13/04* (2006.01)
  *G02F 1/1343* (2006.01)
  *G02B 27/22* (2006.01)

(52) U.S. Cl.
  CPC .......... *G02F 1/1335* (2013.01); *H04N 13/0475* (2013.01); *G02F 1/134309* (2013.01); *H04N 13/0409* (2013.01); *G02B 27/2214* (2013.01); *H04N 13/0479* (2013.01); *H04N 13/0477* (2013.01)
  USPC .............................. 349/15; 349/139; 345/212

(58) Field of Classification Search
  CPC .. G02B 27/22; G02B 27/2214; G02B 27/225; G02B 27/2228; H04N 13/0409; H04N 13/0404; H04N 13/0413; H04N 13/0415; H04N 13/00; G02F 1/1343; G02F 1/133; G02F 1/13439
  USPC ....................... 349/15; 345/98–100, 208–213
  See application file for complete search history.

(56) References Cited

U.S. PATENT DOCUMENTS

| 8,040,371 | B2 * | 10/2011 | Kim et al. ........................ 348/51 |
| 8,416,354 | B2 * | 4/2013 | Liu et al. ......................... 349/15 |
| 2008/0218459 | A1 * | 9/2008 | Kim et al. ....................... 345/87 |
| 2012/0229720 | A1 * | 9/2012 | Lee et al. ........................ 349/15 |

FOREIGN PATENT DOCUMENTS

| KR | 1020070023849 A | 3/2007 |
| KR | 1020110005494 A | 1/2011 |
| KR | 1020120015259 A | 2/2012 |
| WO | WO 2010120010 A1 * | 10/2010 |
| WO | WO 2011074763 A2 * | 6/2011 |

* cited by examiner

*Primary Examiner* — Edward Glick
*Assistant Examiner* — David Chung
(74) *Attorney, Agent, or Firm* — William Park & Associates Patent Ltd.

(57) ABSTRACT

A stereoscopic image panel according to the present invention includes: a liquid crystal layer; a first parallax barrier layer including a first electrode unit adjacent to one side of the liquid crystal layer and a second electrode unit opposite the other side of the liquid crystal layer; and a second parallax barrier layer including a third electrode unit opposite one side of the liquid crystal layer, between the liquid crystal layer and the first electrode unit, and a fourth electrode unit positioned adjacent to the second electrode unit, wherein the second electrode unit is positioned between the liquid crystal layer and the fourth electrode unit.

14 Claims, 10 Drawing Sheets

STEREO-SCOPIC IMAGE PANEL, STEREO-SCOPIC IMAGE DISPLAY APPARATUS HAVING THE SAME AND DRIVING METHOD THEREOF

CROSS-REFERENCE TO RELATED APPLICATIONS

This application claims the benefit of priority of Korean Patent Application No. 10-2011-0101084 filed on Oct. 5, 2011, all of which is incorporated by reference in their entirety herein.

BACKGROUND OF THE INVENTION

1. Field of the Invention

The present invention relates to a stereoscopic image panel, a stereoscopic image display apparatus having the same, and a driving method thereof, and more particularly, to a stereoscopic image panel that provides a glasses-free stereoscopic image, an stereoscopic image display apparatus having the stereoscopic image panel, and a method of driving the stereoscopic image panel.

2. Discussion of the Related Art

In general, the technology related to stereoscopic image display apparatuses is used in various fields, not only in the image-related field, but the aerospace industry and the art industry, including consumer-electronics and telecommunication industries. The stereoscopic image display apparatuses largely employ glasses type and glasses-free type of stereoscopic image-generating techniques.

The glasses type is classified into a coded glasses type with wavelength option, a polarized glasses type using a light blocking effect of a polarizer, and a time-division glasses type alternately providing left and right images within the time of the residual image of eyes. However, the glasses type has a problem in that it is inconvenient to put on glasses when watching a stereoscopic image and eye strain is caused in long time watching. Therefore, researches of developing a glasses-free type of stereoscopic image-generating technique have been conducted to solve such a problem as mentioned above. A method in the researches has been disclosed in Korean Patent Publication No. 2007-0023849 (2007.03.02).

The published invention adopts a structure of bonding a plurality of micro-barrier electrodes on an LCD panel. Therefore, the published invention makes it possible to adjust a watching distance and a viewing angle for a stereoscopic image display by driving only the micro-barrier corresponding to the watching distance of a viewer. However, in the published invention, light is partially transmitted through the gaps between the micro-barrier electrodes, such that crosstalk may be generated. Therefore, the published invention may have a problem in that the quality of a stereoscopic image is deteriorated and bonding becomes difficult.

SUMMARY OF THE INVENTION

It is an object of the present invention to provide a stereoscopic image panel making it possible to freely watch a stereoscopic image by being equipped with parallax barriers, a stereoscopic image display apparatus including the stereoscopic image panel, and a method of driving the stereoscopic image panel.

To accomplish the above-mentioned objects, the present invention provides a stereoscopic image panel including: a liquid crystal layer; a first parallax barrier layer including a first electrode unit adjacent to one side of the liquid crystal layer and a second electrode unit opposite the other side of the liquid crystal layer; and a second parallax barrier layer including a third electrode unit opposite one side of the liquid crystal layer, between the liquid crystal layer and the first electrode unit, and a fourth electrode unit positioned adjacent to the second electrode unit, wherein the second electrode unit is positioned between the liquid crystal layer and the fourth electrode unit.

The second electrode unit may include first and second electrodes each having one side opposite the other side of the liquid crystal layer, and the third electrode unit includes third and fourth electrodes each having one side opposite one side of the liquid crystal layer.

The end of one side of the first electrode may overlap the end of one side of the third electrode in the vertical direction of the liquid crystal layer, and the end of the other side of the third electrode may overlap the end of one side of the second electrode which is adjacent to the end of one side of the first electrode in the vertical direction of the liquid crystal layer.

The first and second parallax barrier layers may be implemented by transparent electrodes.

Further, the present invention provides a stereoscopic image display apparatus that includes the stereoscopic image panel, including: a measuring unit that measures positional information of a viewer; a control unit that selects the first and second parallax barrier layers of the stereoscopic image panel on the basis of the positional information of the viewer provided from the measuring unit; and a driving circuit unit that applies driving power to the first and second parallax barrier layers selected by the control unit.

The stereoscopic image display apparatus may further include an image panel that is disposed at a side of the stereoscopic image panel and reproduces images that are the base of a stereoscopic image.

Further, the present invention provides a method of driving a stereoscopic image panel, which includes a liquid crystal layer, a first parallax barrier layer that includes a first electrode unit adjacent to one side of the liquid crystal layer and a second electrode unit including first and second electrodes each having one side opposite the other side of the liquid crystal layer, and a second parallax barrier layer that includes a third electrode unit including third and fourth electrodes each having one side adjacent to one side of the liquid crystal layer and a fourth electrode unit positioned adjacent to the second electrode unit, wherein the second electrode unit is positioned between the liquid crystal layer and the fourth electrode unit, includes changing the state of the liquid crystal layer by selectively applying a driving voltage to at least one or more of the first parallax barrier layer and the second parallax barrier layer.

The end of one side of the first electrode may overlap the end of one side of the third electrode in the vertical direction of the liquid crystal layer, and the end of the other side of the third electrode may overlap the end of one side of the second electrode which is adjacent to the end of one side of the first electrode in the vertical direction of the liquid crystal layer.

The method of driving a stereoscopic image panel may include: in a case that the liquid crystal layer is configured to block light when an electric field is formed, and to transmit light when an electric field is not formed, a) forming first a state transition in the liquid crystal layer by applying the driving voltage between the fourth electrode unit and the third electrode and between the fourth electrode unit and the fourth electrode; b) forming a second state transition in the liquid crystal layer by simultaneously applying the driving voltage between the fourth electrode unit and the third electrode and between the fourth electrode unit and the fourth electrode, by simultaneously applying the driving voltage between the first electrode and the first electrode unit and between the second electrode and the first electrode unit, and by generating a short circuit between the first electrode and the third electrode and between the second electrode and the fourth electrode; c) forming a third state transition in the liquid crystal layer by simultaneously applying the driving voltage between the first electrode and the first electrode unit and between the second electrode and the first electrode unit; and d) forming a fourth state transition in the liquid crystal layer by simultaneously applying the driving voltage between the fourth electrode unit and the third electrode and between the fourth electrode unit and the fourth electrode, by simultaneously applying the driving voltage between the first electrode and the first electrode unit and between the second electrode and the first electrode unit, and by generating a short circuit between the first electrode and the fourth electrode and between the second electrode and the third electrode.

The method of driving a stereoscopic image panel may include: in a case that the liquid crystal layer is configured to transmit light when an electric field is formed, and to block light when an electric field is not formed, a) forming a first state transition in the liquid crystal layer by simultaneously applying the driving voltage between the first electrode and the first electrode unit and between the second electrode and the first electrode unit and by generating a short circuit between the first electrode and the third electrode, between the second electrode and the third electrode, between the first electrode and the fourth electrode, and between the second electrode and the fourth electrode; b) forming a second state transition in the liquid crystal layer by simultaneously applying the driving voltage between the first electrode and the third electrode and between the second electrode and the fourth electrode; c) forming a third state transition in the liquid crystal layer by simultaneously applying the driving voltage between the fourth electrode unit and the third electrode and between the fourth electrode unit and the fourth electrode and by generating a short circuit between the first electrode and the third electrode, between the second electrode and the third electrode, between the first electrode and the fourth electrode, and between the second electrode and the fourth electrode; and d) forming a fourth state transition in the liquid crystal layer by simultaneously applying the driving voltage between the second electrode and the third electrode and between the first electrode and the fourth electrode.

According to a stereoscopic image panel, a stereoscopic image display apparatus including the stereoscopic image panel, and a method of driving the stereoscopic image panel of the present invention, it is possible to implement a smooth and free stereoscopic image by minimizing discontinuity generated when moving a barrier and minimizing crosstalk.

Further, the technical effect of the present invention described above is not limited to the effect described above and other technical effects not stated herein can be clearly understood by those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Hereinafter, a stereoscopic image panel, a stereoscopic image display apparatus including the stereoscopic image panel, and a method of driving the stereoscopic image panel in accordance with the present invention are described in detail with reference to the accompanying drawings.

Figure 1:
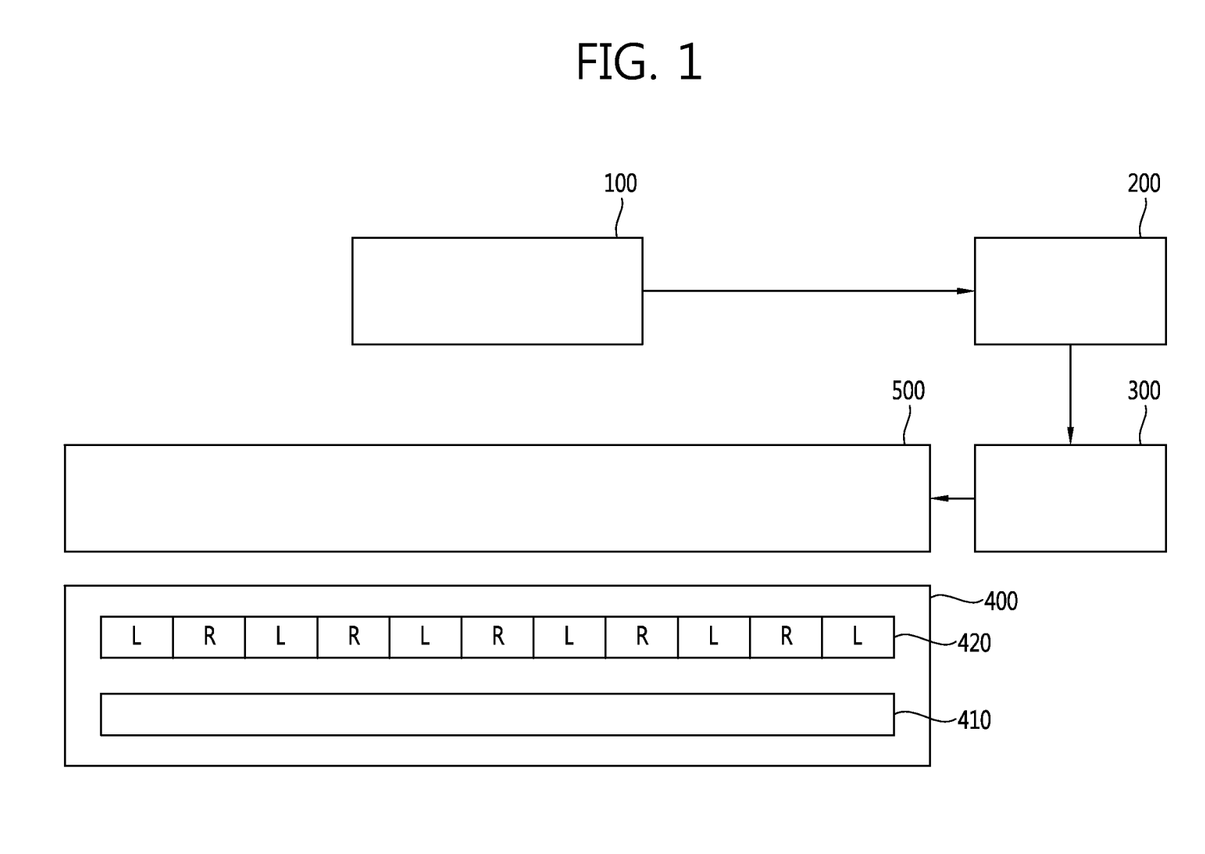
FIG. 1 is a configuration diagram showing a stereoscopic image display apparatus according to an exemplary embodiment of the present invention.

FIG. 1 is a configuration diagram showing a stereoscopic image display apparatus according to an exemplary embodiment of the present invention.

As shown in FIG. 1, the stereoscopic image display apparatus includes a measuring unit 100, a control unit 200, a driving circuit unit 300, an image panel 400, and a stereoscopic image panel 500.

The measuring unit 100 is provided to measure the positional information of a viewer, such as the distance from the viewer, the left and right positions, and face inclination. A measuring sensor and a camera may be used as the measuring unit 100. For example, an IR (Infrared Ray), ultrasonic waves or a laser sensor may be selectively used as the measuring sensor, and a regular camera such as a 2D camera and a stereo-camera may be selectively used as the camera.

The control unit 200 selects parallax barrier layers 1PB and 2PB (see FIG. 2) of the stereoscopic image panel 500 on the basis of the positional information of the viewer transmitted from the measuring unit 100. Further, the driving circuit unit 300 is provided to apply a driving voltage Vb to the parallax barrier layers 1PB and 2PB selected by the control unit 200.

The image panel 400 may be a general display in order to reproduce an image in a pixel unit. The image panel 400 includes a backlight 410 and a LCD pixels 420. The LCD pixels 420 may includes right eye pixels R that are shown to the viewer's right eye and left eye pixels L that are shown the viewer's left eye.

Figure 2:
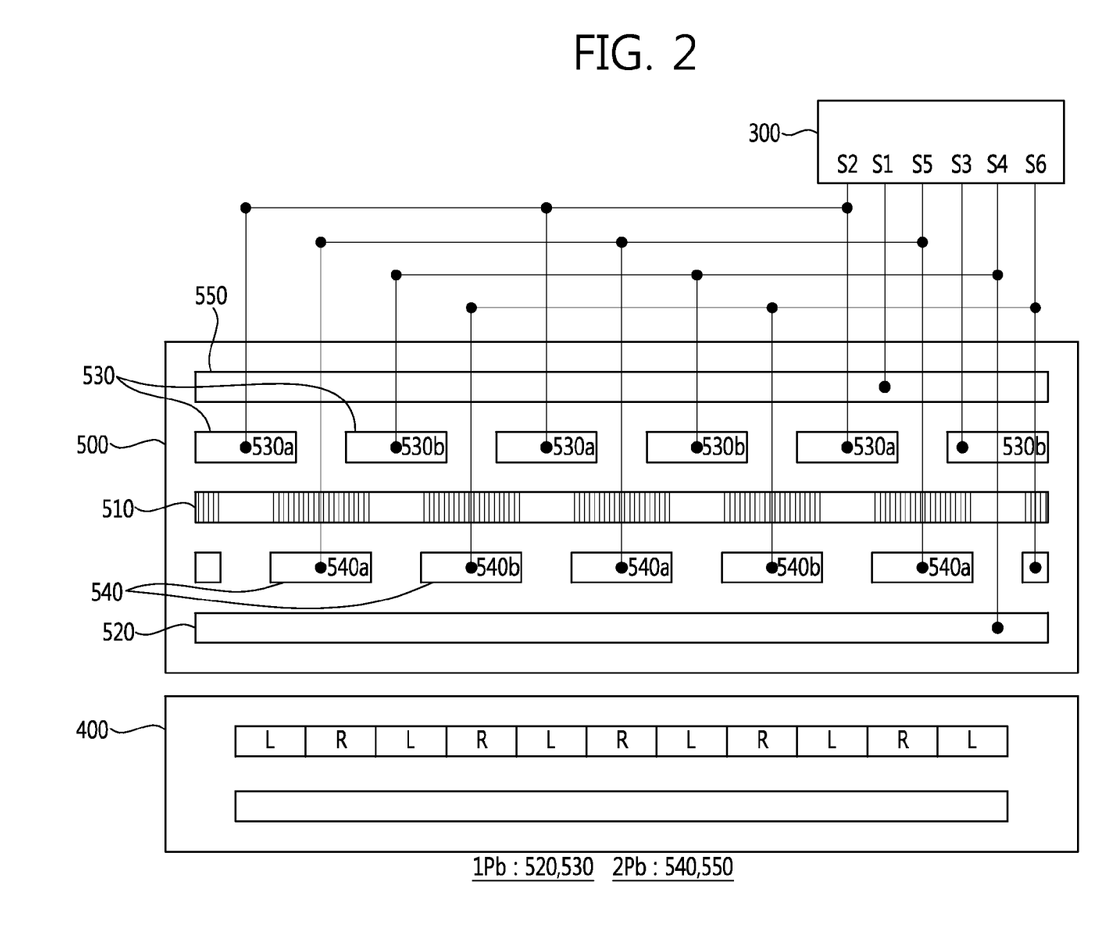
FIG. 2 is a configuration diagram showing the structure of the stereoscopic image panel according to the exemplary embodiment.

FIG. 2 is a configuration diagram showing the structure of a stereoscopic image panel of the stereoscopic image display apparatus according to the exemplary embodiment.

As shown in FIG. 2, the stereoscopic image panel 500 is positioned at a side of the image panel 400. The stereoscopic image panel 500 is provided to provide a viewer with a stereoscopic image on the basis of the images provided from the image panel 400. The stereoscopic image panel 500 may include a liquid crystal layer 510, a first parallax barrier layer 1PB, and a second parallax barrier layer 2PB.

The liquid crystal layer 510 blocks or transmits the images reproduced from the image panel 400. The liquid crystal layer 510 may be used in a (normally black) way of transmitting light when a predetermined electric field is generated and of blocking light when an electric field is not generated, and a (normally white) way of blocking light when a predetermined electric field is generated and of transmitting light when an electric field is not generated in the liquid crystal layer 510.

The first parallax barrier layer 1PB includes first and second electrode units 520 and 530.

The first electrode unit 520 is disposed adjacent to a side of the liquid crystal layer 510. The first electrode unit 520 may be positioned opposite the liquid crystal layer 510 throughout the entire area of the liquid crystal layer 510.

The second electrode unit 530 is positioned opposite the other side of the side where the first electrode unit 520 is positioned, with respect to the liquid crystal layer 510. The second electrode unit 530 includes first and second electrodes 530a and 530b. The first and second electrodes 530a and 530b are positioned such that one side of each of electrodes is opposite the liquid crystal layer 510 throughout the liquid crystal layer 510. A plurality of first and second electrodes 530a and 530b may be alternately disposed. Further, the first and second electrodes 530a and 530b may be implemented by ITO (Indium Tin Oxide) transparent electrodes.

The second parallax barrier layer 2PB include third and fourth electrode units 540 and 550.

The third electrode unit 540 is positioned opposite one side of the liquid crystal layer 510, between the liquid crystal layer 510 and the first electrode unit 520. The third electrode unit 540 includes third and fourth electrodes 540a and 540b. The third and fourth electrodes 540a and 540b are positioned opposite one side of the liquid crystal layer 510 throughout the entire area of the liquid crystal layer 510. Further, a plurality of third and fourth electrodes 540a and 540b may be alternately disposed.

The fourth electrode unit 550 is positioned adjacent to he second electrode unit 530 such that the second electrode 530 is positioned between the liquid crystal layer 510 and the fourth electrode unit 550. The fourth electrode unit 550 is disposed throughout the entire area of the liquid crystal layer 510. Further, the third and fourth electrode units 540 and 550 may be implemented by ITO transparent electrodes.

The first, second, third, and fourth electrodes 530a, 530b, 540a, and 540b may be arranged such that the left and right ends symmetrically overlap each other. For example, the end of one side of the first electrode 530a may overlap the end of one side of the third electrode 540a in the vertical direction of the liquid crystal layer 510. Further, the end of the other side of the third electrode 540a may overlap the end of one side of the second electrode 530b, which is adjacent to the end of one side of the first electrode 530a, in the vertical direction of the liquid crystal layer 510.

The operational state of the stereoscopic image panel according to the exemplary embodiment is described hereafter in detail with reference to the accompanying drawings. The (normally white) way of blocking light when a predetermined electric field is generated and of transmitting light when an electric field is not generated in a liquid crystal layer is exemplified in the following description.

FIGS. 3A to 3D are configuration diagrams showing a transition state of the stereoscopic image panel according to the exemplary embodiment of the present invention.

As shown in FIGS. 3A to 3D, the stereoscopic image panel 500 may have four state transitions in accordance with the driving voltage Vb applied to the first and second parallax barrier layers 1PB and 2PB. A driving method of four state transitions of the stereoscopic image panel 500 is described in detail with reference to the following Table 1.

TABLE 1

| DLPB operation state | Driving circuit operated |
| --- | --- |
| State 1 | s1-s5: driving voltage (Vd1) applied |
|  | s1-s6: driving voltage (Vd1) applied |
| State 2 | s1-s5: driving voltage (Vd1) applied |
|  | s1-s6: driving voltage (Vd1) applied |
|  | s2-s4: driving voltage (Vd2) applied |
|  | s3-s4: driving voltage (Vd2) applied |
|  | s2-s5: short |
|  | s3-s6: short |
| State 3 | s2-s4: driving voltage (Vd2) applied |
|  | s3-s4: driving voltage (Vd2) applied |
| State 4 | s1-s5: driving voltage (Vd1) applied |
|  | s1-s6: driving voltage (Vd1) applied |
|  | s2-s4: driving voltage (Vd2) applied |
|  | s3-s4: driving voltage (Vd2) applied |
|  | s2-s6: short |
|  | s3-s5: short |

In Table 1, s1 indicates connection between the driving circuit unit 300 and the fourth electrode unit 550, s2 indicates connection between the driving circuit unit 300 and the first electrode 530a, s3 indicates connection between the driving circuit unit 300 and the second electrode 530b, s4 indicates connection between the driving circuit unit 300 and the first electrode unit 520, s5 indicates connection between the driving circuit unit 300 and the third electrode 540a, and s6 indicates connection between the driving circuit unit 300 and the fourth electrode 540b.

Figure 3A:
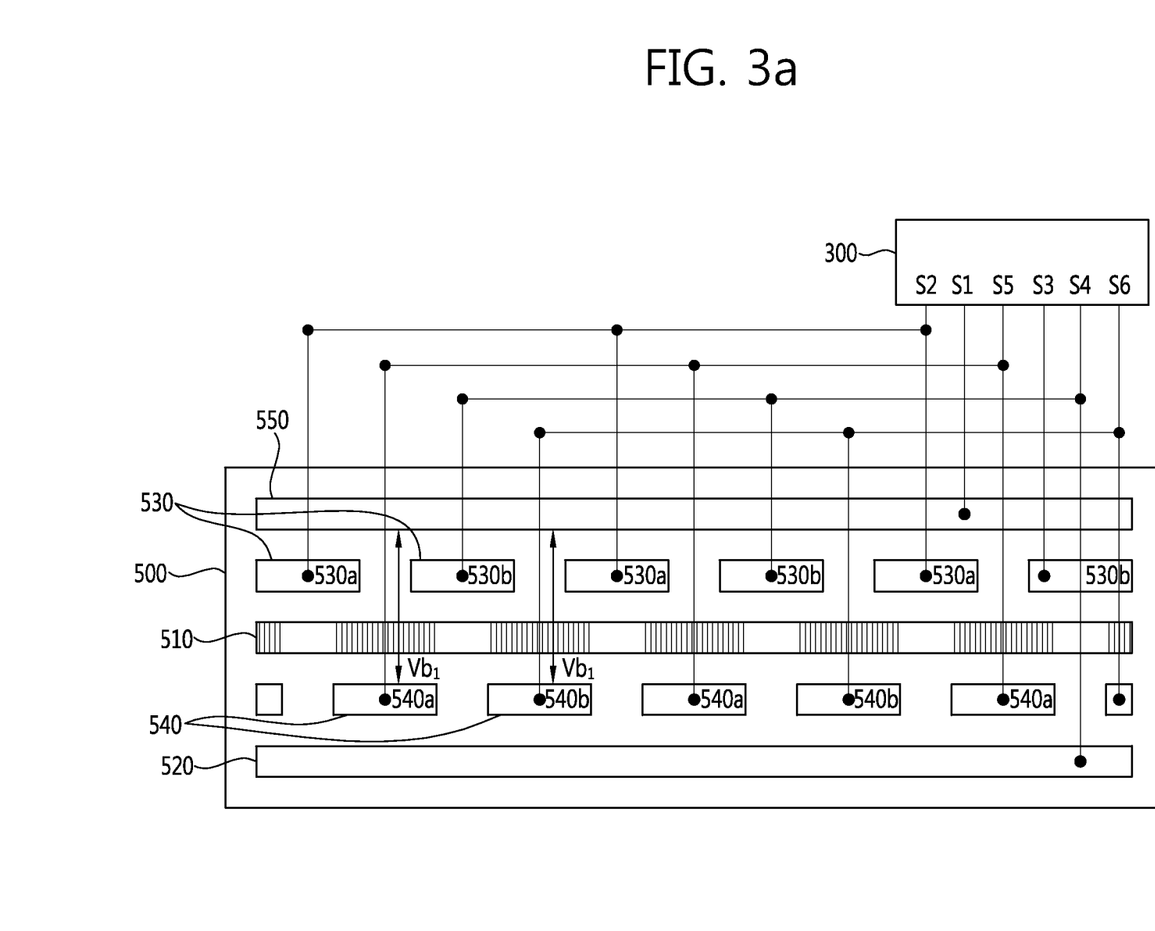
FIGS. 3A to 3D are configuration diagrams showing a transition state of the stereoscopic image panel according to the exemplary embodiment of the present invention.

FIG. 3A is a diagram showing a first state (State 1) of the stereoscopic image panel according to the exemplary embodiment. The first state is implemented, when a first driving voltage Vb1 is simultaneously applied between s1 and s5 and between s1 and s6.

Figure 3B:
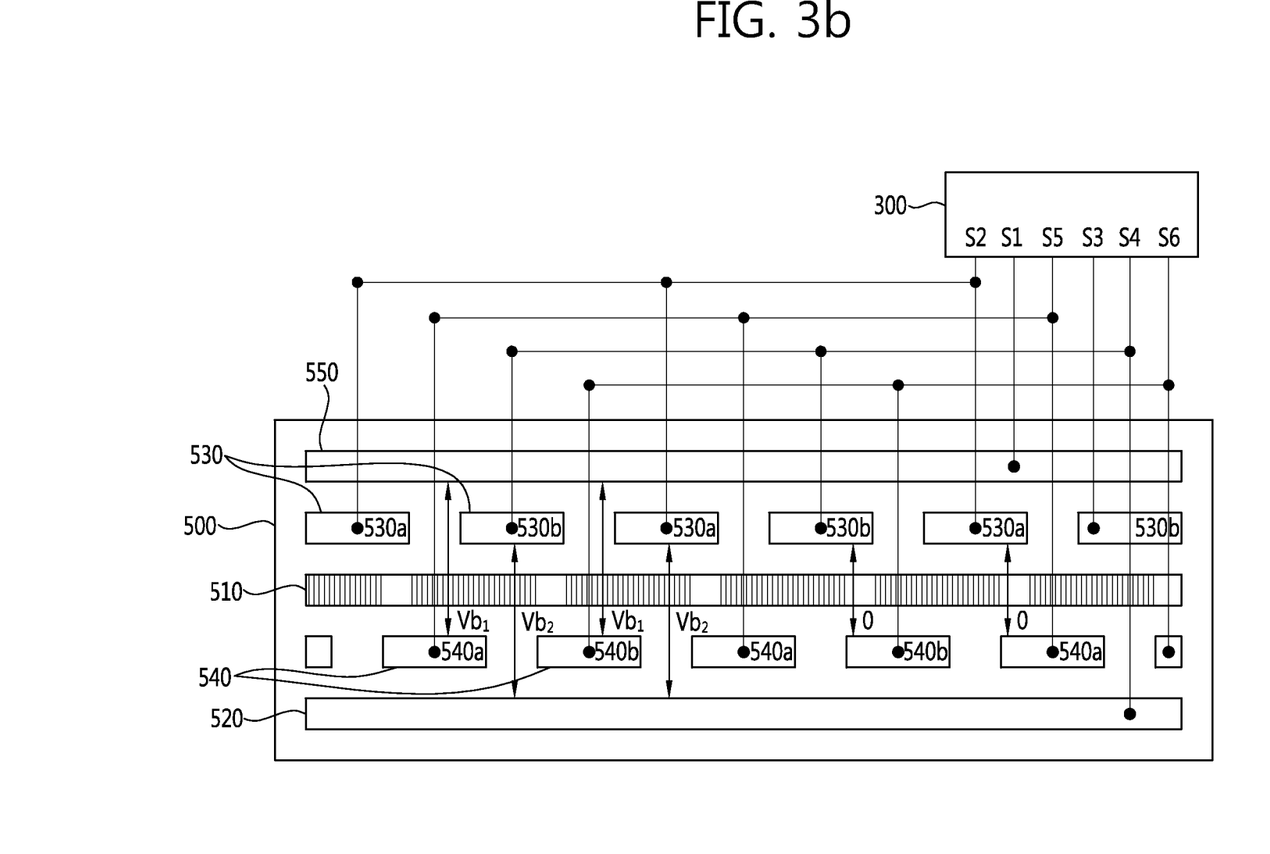

FIG. 3B is a diagram showing a second state (State 2) of the stereoscopic image panel according to the exemplary embodiment. The second state is implemented, when the first driving voltage Vb1 is simultaneously applied between s1 and s5 and between s1 and s6, a second driving voltage Vb2 is simultaneously applied between s2 and s4 and between s3 and s4, and a short circuit is generated between s2 and s5 and between s3 and s6.

Figure 3C:
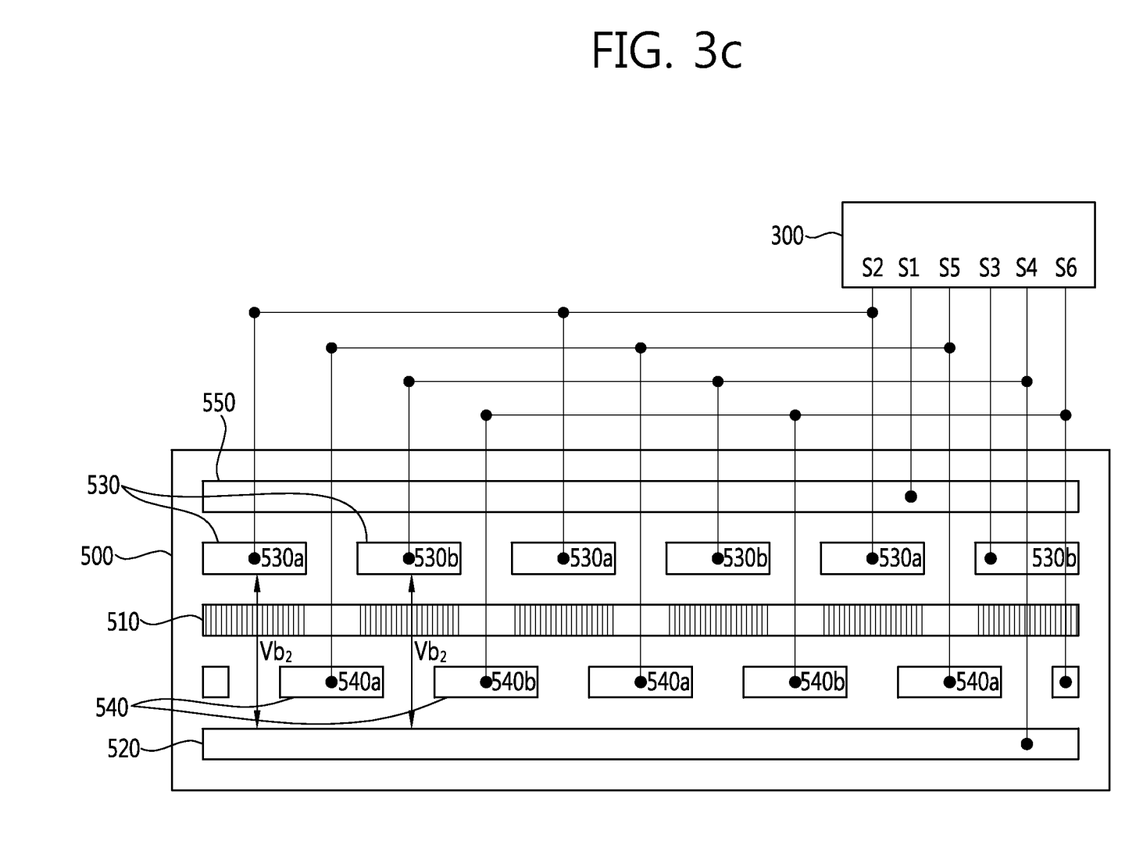

FIG. 3C is a diagram showing a third state (State 3) of the stereoscopic image panel according to the exemplary embodiment. The third state is implemented, when the second driving voltage Vb2 is simultaneously applied between s2 and s4 and between s3 and s4.

Figure 3D:
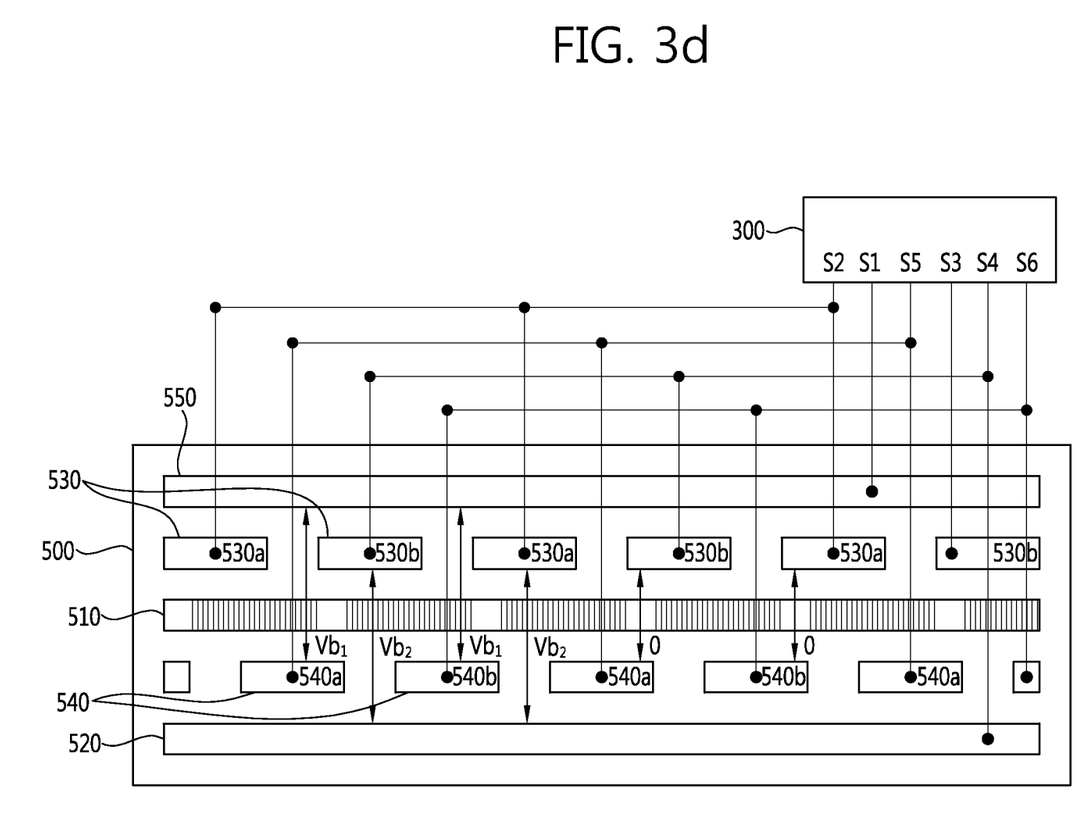

FIG. 3D is a diagram showing a fourth state (State 4) of the stereoscopic image panel according to the exemplary embodiment. The fourth state is implemented, when the first driving voltage Vb1 is simultaneously applied between s1 and s5 and between s1 and s6, the second driving circuit Vb2 is simultaneously applied between s2 and s4 and between s3 and s4, and a short circuit is generated between s2 and s6 and between s3 and s5.

It can be seen from FIGS. 3A to 3D that even if the driving voltage Vb is applied to the first an second parallax barrier layers 1PB and 2PB such that light is blocked throughout the entire area of the liquid crystal layer 510 in the stereoscopic image panel 500, the voltage differences at the overlapping sections of the first, second, third, and fourth electrodes 530a, 530b, 540a, and 540b are 0, so that an electric field is not generated in the liquid crystal layer 510 and light can be transmitted.

The operational state of a stereoscopic image panel according to another exemplary embodiment is described hereafter in detail with reference to the accompanying drawings. The (normally black) way of transmitting light when a predetermined electric field is generated and of blocking light when an electric field is not generated in a liquid crystal layer is exemplified in the following description.

FIGS. 4A to 4D are configuration diagrams showing a transition state of a stereoscopic image panel according to another exemplary embodiment of the present invention.

As shown in FIGS. 4A to 4D, a stereoscopic image panel 500 according to another exemplary embodiment may have four state transitions in accordance with the driving voltage Vb applied to the first and second parallax barrier layers 1PB and 2PB. A driving method of four state transitions of the stereoscopic image panel 500 is described in detail with reference to the following Table 2.

TABLE 2

| DLPB operation state | Driving circuit operated |
|---|---|
| State 1 | s2-s4: driving voltage (Vd2) applied |
| | s3-s4: driving voltage (Vd2) applied |
| | s2-s5: short |
| | s3-s5: short |
| | s2-s6: short |
| | s3-s6: short |
| State 2 | s2-s5: driving voltage (Vd3) applied |
| | s3-s6: driving voltage (Vd3) applied |
| State 3 | s1-s5: driving voltage (Vd1) applied |
| | s1-s6: driving voltage (Vd1) applied |
| | s2-s5: short |
| | s3-s5: short |
| | s2-s6: short |
| | s3-s6: short |
| State 4 | s3-s5: driving voltage (Vd3) applied |
| | s2-s6: driving voltage (Vd3) applied |

In Table 2, s1 indicates connection between the driving circuit unit 300 and the fourth electrode unit 550, s2 indicates connection between the driving circuit unit 300 and the first electrode unit 530a, s3 indicates connection between the driving circuit unit 300 and the second electrode 530b, s4 indicates connection between the driving circuit unit 300 and the first electrode unit 520, s5 indicates connection between the driving circuit unit 300 and the third electrode 540a, and s6 indicates connection between the driving circuit unit 300 and the fourth electrode 540b.

Figure 4A:
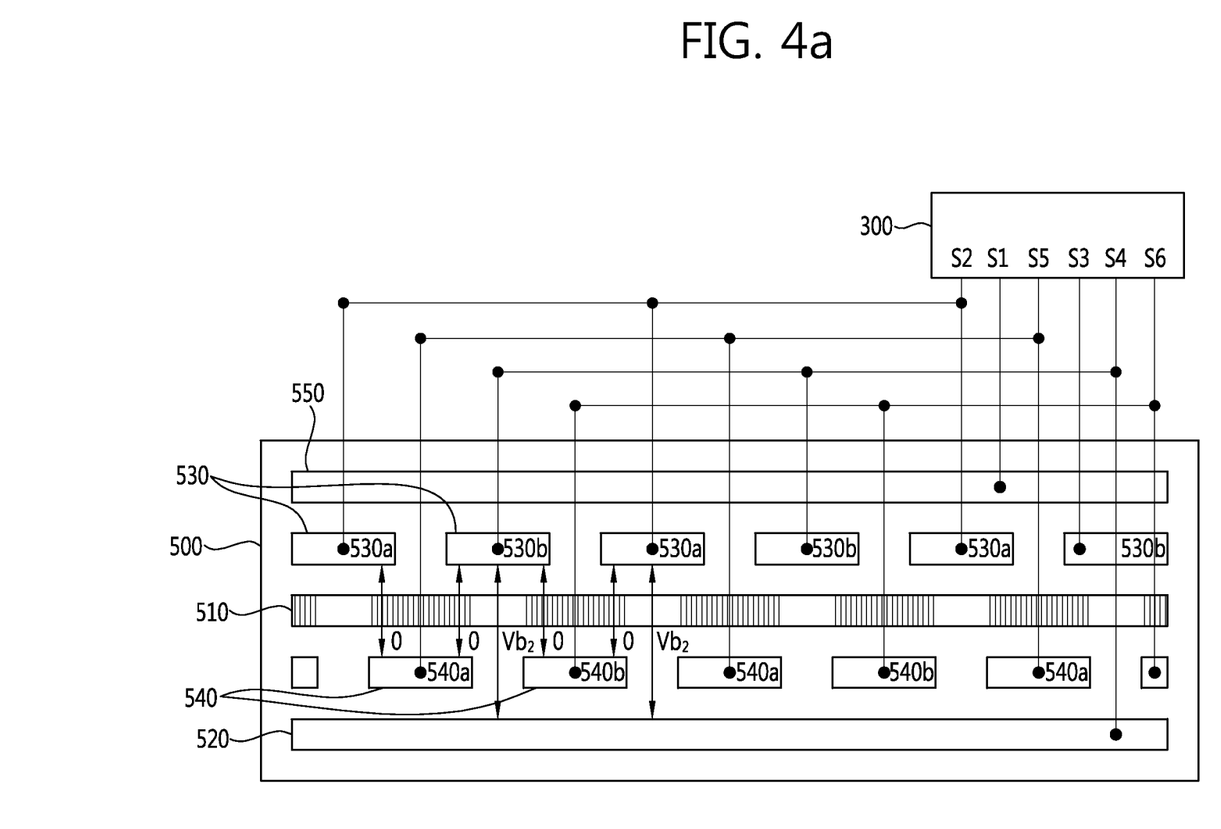
FIGS. 4A to 4D are configuration diagram showing a transition state of a stereoscopic image panel according to another exemplary embodiment of the present invention.

FIG. 4A is a diagram showing a first state (State 1) of the stereoscopic image panel according to another exemplary embodiment. The first state is implemented, when a second driving voltage Vb2 is simultaneously applied between s2 and s4 and between s3 and s4 and a short circuit is generated between s2 and s5, between s3 and s5, between s2 and s6, and between s3 and s6.

Figure 4B:
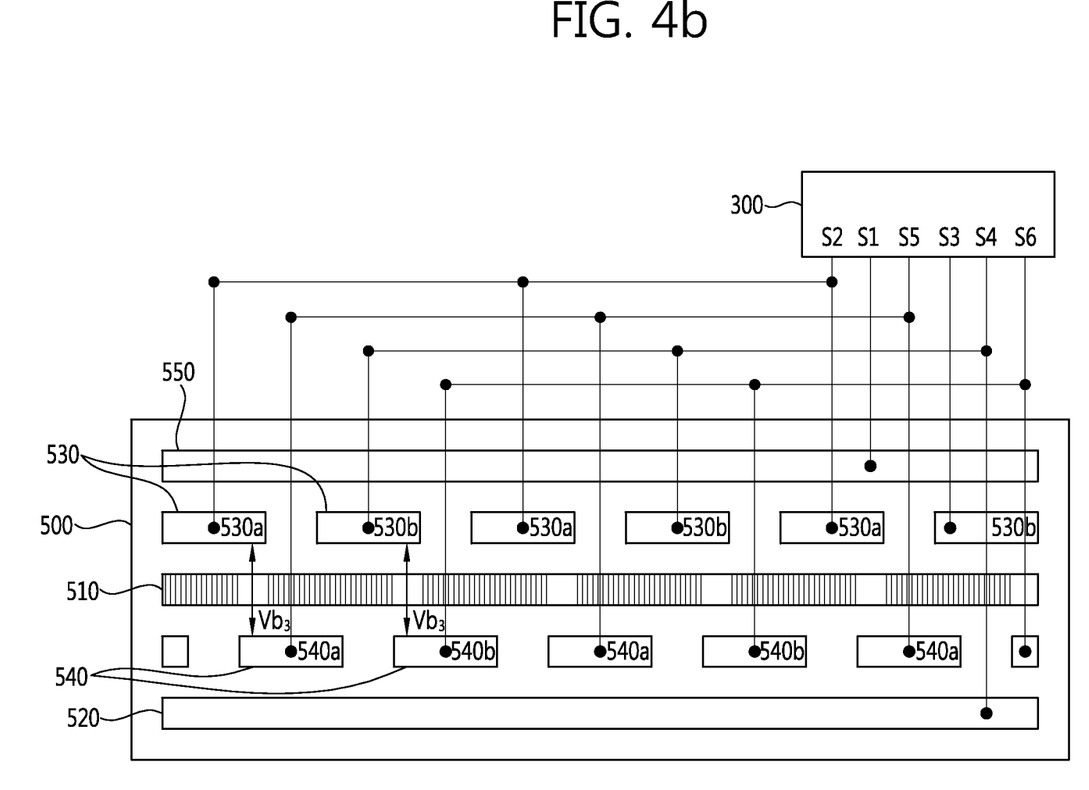

FIG. 4B is a diagram showing a second state (State 2) of the stereoscopic image panel according to another exemplary embodiment. The second state is implemented, when a third driving voltage Vb3 is simultaneously applied between s2 and s5 and between s3 and s6.

Figure 4C:
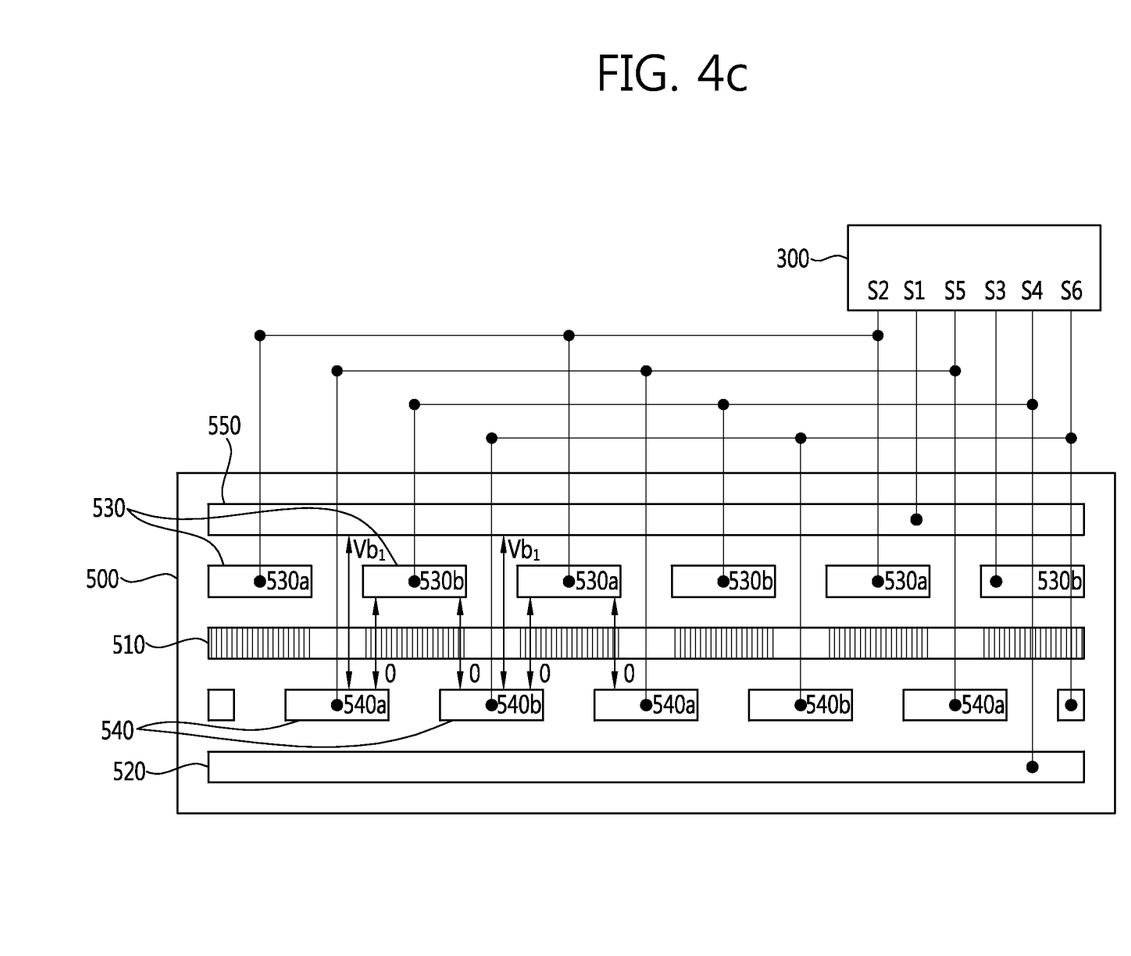

FIG. 4C is a diagram showing a third state (State 3) of the stereoscopic image panel according to another exemplary embodiment. The third state is implemented, when the first driving voltage Vb1 is simultaneously applied between s1 and s5 and between s1 and s6, and a short circuit is generated between s2 and s5, between s3 and s5, between s2 and s6, and between s3 and s6.

Figure 4D:
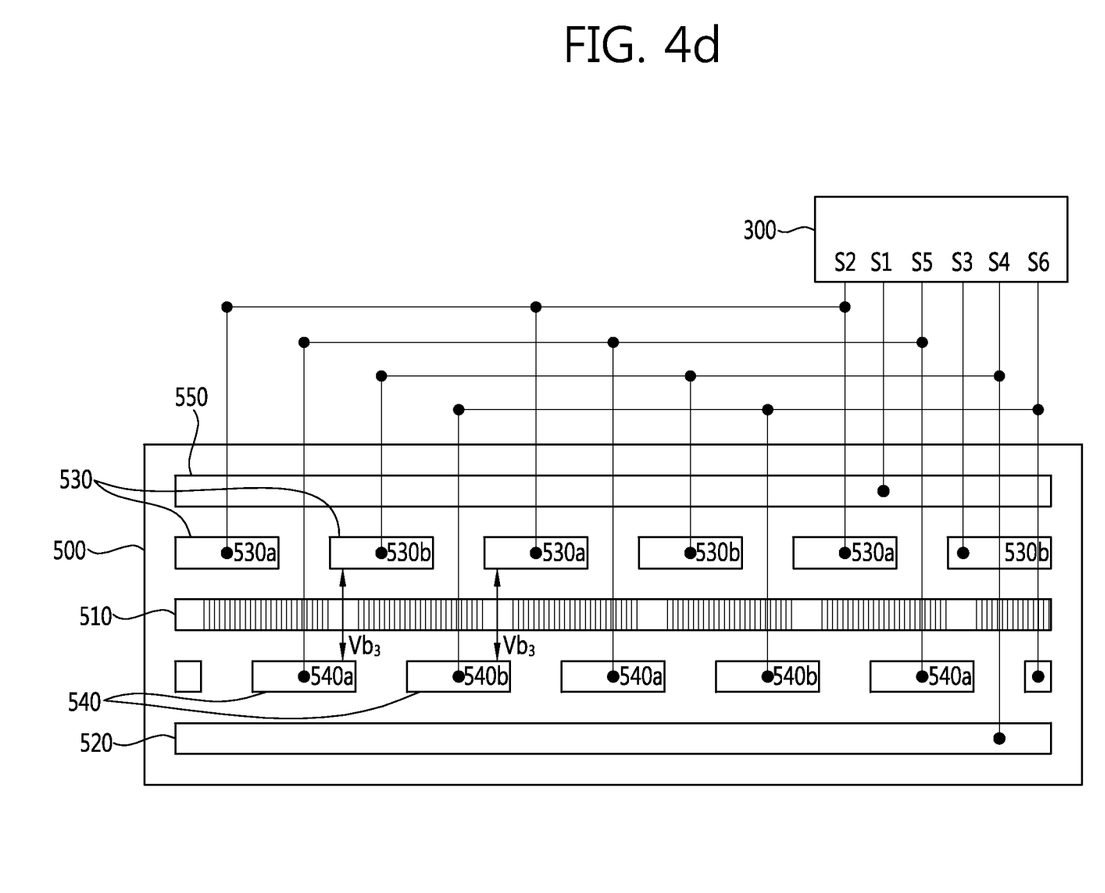

FIG. 4D is a diagram showing a fourth state (State 4) of the stereoscopic image panel according to another exemplary embodiment. The third state is implemented, when the third driving voltage Vb3 is simultaneously applied between s3 and s5 and between s2 and s6.

It can be seen from FIGS. 4A to 4D that even if the driving voltage Vb is applied to the first an second parallax barrier layers 1PB and 2PB such that light is transmitted through a portion of the area of the liquid crystal layer 510 in the stereoscopic image panel 500, the voltage differences at the overlapping sections of the first, second, third, and fourth electrodes 530a, 530b, 540a, and 540b are 0, so that an electric field is not generated in the liquid crystal layer 510 and light can be transmitted.

Further, the state of the short circuit means connection of both terminals through a circuit or an equivalent potential state in the present invention. The most typical method of making the equivalent potential state is to ground both terminals through a circuit.

As described above, the stereoscopic image panel, a stereoscopic image display apparatus including the stereoscopic image panel, and a method of driving the stereoscopic image panel according to the present invention, since the transmitting area and the blocking area of the liquid crystal layer 510 transit into four states in accordance with the change in driving voltage Vb applied to the first and second parallax barrier layers 1PB and 2PB by the driving circuit unit 300, can provide a continuous glasses-free stereoscopic image in accordance with changes in position and watching distance of a viewer.

The embodiments of the present invention which are described above and illustrated in the drawings should not be construed as limiting the spirit of the present invention. The protection scope of the present invention is limited only by claims and the present invention may be changed and modified in various ways by those skilled in the art without departing from the scope of the present invention. Therefore, the changes and modifications will be included in the protection scope of the present invention, as long as those are apparent to those skilled in the art.

What is claimed is:

1. A stereoscopic image panel comprising:
  a liquid crystal layer;
  a first parallax barrier layer including a first electrode unit adjacent to one side of the liquid crystal layer and a second electrode unit opposite the other side of the liquid crystal layer; and
  a second parallax barrier layer including a third electrode unit opposite one side of the liquid crystal layer, between the liquid crystal layer and the first electrode unit, and a fourth electrode unit positioned adjacent to the second electrode unit, wherein the second electrode unit is positioned between the liquid crystal layer and the fourth electrode unit;
  a driving circuit configured to apply a driving voltage to the stereoscopic image panel in a plurality of different driving states, wherein the driving states include:

a first driving state, wherein:
the driving voltage is simultaneously applied between the first electrode and the first electrode unit and between the second electrode and the first electrode unit;
the first electrode is shorted to the third electrode;
the second electrode is shorted to the third electrode;
the first electrode is shorted to the fourth electrode; and
the second electrode is shorted to the fourth electrode;
a second driving state, wherein the driving voltage is simultaneously applied between the first electrode and the third electrode and between the second electrode and the fourth electrode;
a third driving state, wherein:
the driving voltage is simultaneously applied between the fourth electrode unit and the third electrode and between the fourth electrode unit and the fourth electrode;
the first electrode is shorted to the third electrode;
the second electrode is shorted to the third electrode;
the first electrode is shorted to the fourth electrode; and
the second electrode is shorted to the fourth electrode; and
a fourth driving state, wherein the driving voltage is simultaneously applied between the second electrode and the third electrode and between the first electrode and the fourth electrode.

2. The stereoscopic image panel of claim 1, wherein the second electrode unit includes first and second electrodes each having one side opposite the other side of the liquid crystal layer, and the third electrode unit includes third and fourth electrodes each having one side opposite one side of the liquid crystal layer.

3. The stereoscopic image panel of claim 2, wherein the end of one side of the first electrode overlaps the end of one side of the third electrode in the vertical direction of the liquid crystal layer, and the end of the other side of the third electrode overlaps the end of one side of the second electrode that is adjacent to the end of one side of the first electrode in the vertical direction of the liquid crystal layer.

4. The stereoscopic image panel of claim 1, wherein the first and second parallax barrier layers are implemented by transparent electrodes.

5. A stereoscopic image display apparatus that includes the stereoscopic image panel of claim 1, comprising:
a measuring unit that measures positional information of a viewer;
a control unit that selects the first and second parallax barrier layers of the stereoscopic image panel on the basis of the positional information of the viewer provided from the measuring unit; and
a driving circuit unit that applies driving power to the first and second parallax barrier layers selected by the control unit.

6. The apparatus of claim 5, further comprising an image panel that is disposed at a side of the stereoscopic image panel and reproduces images that are the base of a stereoscopic image.

7. A method of driving a stereoscopic image panel, the method comprising:
changing a state of a liquid crystal layer by selectively applying a driving voltage to one or more of a first parallax barrier layer and a second parallax barrier layer of the stereoscopic image panel that comprises:
a liquid crystal layer having a first side and a second side opposite the first side;
a first parallax barrier layer comprising a first electrode unit and a second electrode unit, wherein the second electrode unit includes a first electrode and a second electrode;
a second parallax barrier layer comprising a third electrode unit and a fourth electrode unit, wherein the third electrode unit includes a third electrode and a fourth electrode;
wherein the third electrode unit is disposed between the first side of the liquid crystal layer and the first electrode unit, and wherein the second electrode unit is disposed between the second side of the liquid crystal layer and the fourth electrode unit;
wherein the state is one of:
a first state, wherein the driving voltage is simultaneously applied between the fourth electrode unit and the third electrode and between the fourth electrode unit and the fourth electrode;
a second state, wherein:
the driving voltage is simultaneously applied:
between the fourth electrode unit and the third electrode,
between the fourth electrode unit and the fourth electrode,
between the first electrode and the first electrode unit, and
between the second electrode and the first electrode unit;
the first electrode is shorted to the third electrode; and
the second electrode is shorted to the fourth electrode;
a third state, wherein the driving voltage is simultaneously applied between the first electrode and the first electrode unit and between the second electrode and the first electrode unit; and
a fourth state, wherein:
the driving voltage is simultaneously applied:
between the fourth electrode unit and the third electrode,
between the fourth electrode unit and the fourth electrode,
between the first electrode and the first electrode unit, and
between the second electrode and the first electrode unit;
the first electrode is shorted to the fourth electrode; and
the second electrode is shorted to the third electrode.

8. The method of claim 7, wherein the end of one side of the first electrode overlaps the end of one side of the third electrode in the vertical direction of the liquid crystal layer, and the end of the other side of the third electrode overlaps the end of one side of the second electrode which is adjacent to the end of one side of the first electrode in the vertical direction of the liquid crystal layer.

9. The method of claim 7,
wherein the liquid crystal layer is configured to block light when an electric field is formed and to transmit light when the electric field is not formed.

10. The stereoscopic image panel of claim 1, wherein the liquid crystal layer is configured to transmit light when an electric field is formed and to block light when the electric field is not formed.

11. A stereoscopic image panel comprising:
a liquid crystal layer having a first side and a second side opposite the first side;
a first parallax barrier layer comprising a first electrode unit and a second electrode unit, wherein the second electrode unit includes a first electrode and a second electrode;
a second parallax barrier layer comprising a third electrode unit and a fourth electrode unit, wherein the third electrode unit includes a third electrode and a fourth electrode;
wherein the third electrode unit is disposed between the first side of the liquid crystal layer and the first electrode unit, and wherein the second electrode unit is disposed between the second side of the liquid crystal layer and the fourth electrode unit;
a driving circuit configured to apply a driving voltage to the stereoscopic image panel in a plurality of different driving states, wherein the driving states include:
a first driving state, wherein the driving voltage is simultaneously applied between the fourth electrode unit and the third electrode and between the fourth electrode unit and the fourth electrode;
a second driving state, wherein:
the driving voltage is simultaneously applied:
between the fourth electrode unit and the third electrode,
between the fourth electrode unit and the fourth electrode,
between the first electrode and the first electrode unit, and
between the second electrode and the first electrode unit;
the first electrode is shorted to the third electrode; and
the second electrode is shorted to the fourth electrode;
a third driving state, wherein the driving voltage is simultaneously applied between the first electrode and the first electrode unit and between the second electrode and the first electrode unit;
a fourth driving state, wherein:
the driving voltage is simultaneously applied:
between the fourth electrode unit and the third electrode,
between the fourth electrode unit and the fourth electrode,
between the first electrode and the first electrode unit, and
between the second electrode and the first electrode unit;
the first electrode is shorted to the fourth electrode; and
the second electrode is shorted to the third electrode.

12. The stereoscopic image panel of claim 11, wherein the liquid crystal layer is configured to block light when an electric field is formed and to transmit light when the electric field is not formed.

13. A method comprising:
changing a state of a liquid crystal layer by selectively applying a driving voltage to one or more of a first parallax barrier layer and a second parallax barrier layer of a stereoscopic image panel that comprises:
the liquid crystal layer having a first side and a second side opposite the first side;
a first parallax barrier layer comprising a first electrode unit and a second electrode unit, wherein the second electrode unit includes a first electrode and a second electrode;
a second parallax barrier layer comprising a third electrode unit and a fourth electrode unit, wherein the third electrode unit includes a third electrode and a fourth electrode;
wherein the third electrode unit is disposed between the first side of the liquid crystal layer and the first electrode unit, and wherein the second electrode unit is disposed between the second side of the liquid crystal layer and the fourth electrode unit;
wherein the state is one of:
a first state, wherein:
the driving voltage is simultaneously applied between the first electrode and the first electrode unit and between the second electrode and the first electrode unit;
the first electrode is shorted to the third electrode;
the second electrode is shorted to the third electrode;
the first electrode is shorted to the fourth electrode; and
the second electrode is shorted to the fourth electrode;
a second state, wherein the driving voltage is simultaneously applied between the first electrode and the third electrode and between the second electrode and the fourth electrode;
a third state, wherein:
the driving voltage is simultaneously applied between the fourth electrode unit and the third electrode and between the fourth electrode unit and the fourth electrode;
the first electrode is shorted to the third electrode;
the second electrode is shorted to the third electrode;
the first electrode is shorted to the fourth electrode; and
the second electrode is shorted to the fourth electrode; and
a fourth state, wherein the driving voltage is simultaneously applied between the second electrode and the third electrode and between the first electrode and the fourth electrode.

14. The method of claim 13, wherein the liquid crystal layer is configured to transmit light when an electric field is formed and to block light when the electric field is not formed.

* * * * *